Figure 1:
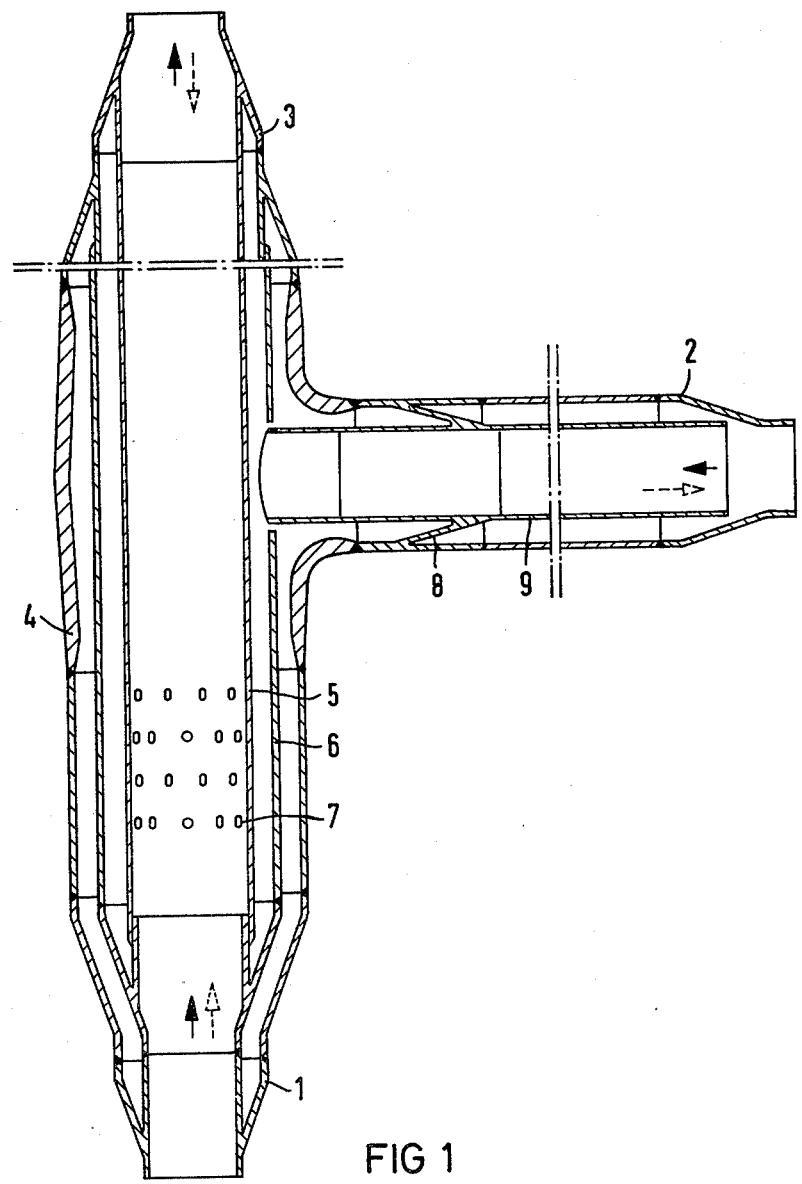

United States Patent [19]

Kastl et al.

[11] 4,230,410

[45] Oct. 28, 1980

[54] MIXING DEVICE FOR FLUIDS OF DIFFERENT AND VARYING TEMPERATURES

[75] Inventors: Johann Kastl, Troisdorf; Heinrich Schütz, Lohmar, both of Fed. Rep. of Germany

[73] Assignee: INTERATOM, International Atomreaktorbau GmbH, Bergisch Gladbach, Fed. Rep. of Germany

[21] Appl. No.: 10,705

[22] Filed: Feb. 8, 1979

[30] Foreign Application Priority Data

Feb. 10, 1978 [DE] Fed. Rep. of Germany ....... 2805576

[51] Int. Cl.² ............................................... B01F 5/00
[52] U.S. Cl. .................................... 366/177; 366/341
[58] Field of Search ............... 366/131, 134, 150, 167, 366/173, 174, 177, 178, 336, 340, 341

[56] References Cited

U.S. PATENT DOCUMENTS

| | | | |
|---|---|---|---|
| 2,747,844 | 5/1956 | Slayter | 366/336 X |
| 3,409,274 | 11/1968 | Lawton | 366/144 |

FOREIGN PATENT DOCUMENTS 45-39591 12/1970 Japan ...................................... 366/167

*Primary Examiner*—Philip R. Coe
*Attorney, Agent, or Firm*—Herbert L. Lerner

[57] ABSTRACT

Mixing device for fluids of high, different and varying temperatures having a housing and a cylindrical, straight mixing tube open at both ends thereof and formed intermediate the ends thereof with numerous radial openings, the mixing tube being secured at one end thereof tightly to the housing and being mounted at the other end thereof so as to be displaceable longitudinally with respect to the housing, including a shock tube disposed between the mixing tube and the housing and being, at least at one end thereof, displaceable longitudinally with respect to the housing and the mixing tube, the mixing tube having an outflow end and being secured at least at the outflow end thereof tightly to the housing, the shock tube and the mixing tube defining an annular space therebetween, an inner pipe stub terminating in the annular space, the inner pipe stub being concentrically surrounded by a housing union tightly connected to the housing, the shock tube being formed with a radial opening through which the inner pipe stub extends with a gap therebetween.

6 Claims, 3 Drawing Figures

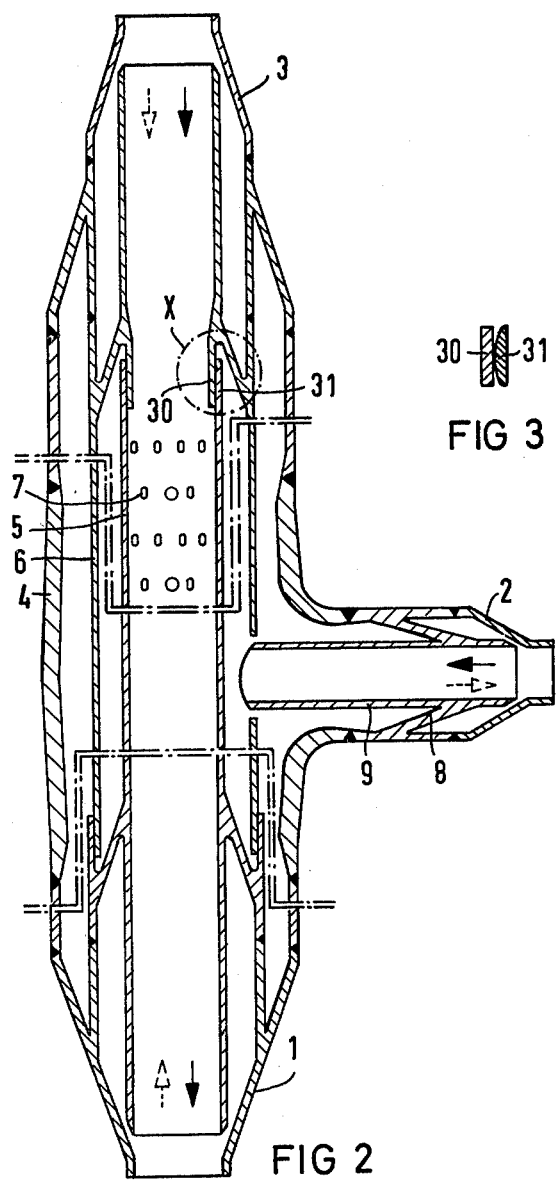

MIXING DEVICE FOR FLUIDS OF DIFFERENT AND VARYING TEMPERATURES

The invention of the instant application relates to a mixing device for fluids of different, varying and high temperatures and, more particularly, to such a mixing device having a housing and a cylindrical straight mixing tube open at both ends thereof and formed intermediate the ends thereof with numerous radial openings, the mixing tube being secured at one end thereof tightly to the housing and being mounted at the other end thereof so as to be displaceable longitudinally with respect to the housing. More specifically the invention relates to T-shaped mixers for liquid-metal flows in nuclear energy plants. It is especially suited for installation at locations at which large mixing vessels cannot be inserted because of spatial limitations and at which normal T-shaped fittings are not suitable because of thermal stress and fatigue.

Because of the high thermal conductivity of liquid metals, mixing devices are imperiled by rapidly varying temperatures, especially at temperatures of about 500° C. and above. It is therefore necessary to protect the pressure-carrying, thick-walled housings by elastic or resilient, thin-walled inserts or internals. This can be effected by disposing an intermediate stagnant layer of liquid metal (shock channel) or even a laminated construction between the pressure-carrying housing and the internals, consisting of a material with a relatively lower thermal conductivity (e.g. steel with respect to sodium or NaK). Special attention must be given, however, to unimpeded expansion of the structual parts and, in the case of reactor installations, additionally to the capability of draining the liquid metal and, with laminated internals in the primary region of a reactor, to increased radiation exposure or dosage in case repair work is required.

Also, during stationary operation i.e. during nonvarying existence of a given temperature difference between the two incoming or supplied flows, asymmetric stressing is produced in normal T-sections of pipings, as well as stressing by temperature oscillations which are due to the mixing process per se, the latter stressing being of decisive importance with respect to the durability or life of the structural parts of such mixers.

In principle, a high degree of turbulence in the mixture also results in a high-frequency spectrum of the temperature oscillations at the wall of the structural parts. The higher the frequency of these oscillations, the lesser is the depth of penetration of such alternating stresses or loadings into the wall of the structural parts for the same heat transfer and the same amplitude. What is essential for the stressing is the difference between the surface temperature at the wall and the simultaneous mean temperature in the wall. This difference and the stressing, accordingly, decrease with increasing frequency, and simultaneously also the depth of material affected by the stressing. On the other hand, higher frequencies directly produce a greater number of load cycles within the operating period of the mixer and, thus, effect a reduction in the durability or life span thereof. These two effects oppose one another and result in a minimum of fatigue, dependent upon the frequency spectrum for a given wall thickness and heat transfer.

In U.S. Pat. No. 3,409,274, a mixing device for high-pressure fluids at different temperatures for a steam generator is described. In a thick-walled, cylindrical housing, a likewise thick-walled pipe stub or union terminates in a T-shaped manner within a space concentric or coaxial with the housing and defined by and between the thick-walled housing and a thin-walled tube. This thin-walled tube is formed, in vicinity of the inlet, with numerous holes which are distributed about the periphery and over part of the length of the tube. In the flow direction upstream and downstream of these numerous holes, circular ring-shaped plates having small perforations formed therein are disposed, the perforations permitting only a very limited flow. Analysis has established that this construction is unsuited for great temperature differences and transients i.e. temperature rates of change especially in liquid-metal installations, even if the wall thicknesses of the housing are reduced considerably in accordance with the low pressure of the hot liquid metal. The medium entering through the T-shaped inlet strikes the inner wall of the housing directly and produces excessive thermal stresses thereat, which cause fatigue failure of the material when there are many temperature cycles. It has furthermore been found experimentally that, in such a mixer of about 100 m inner diameter, the length of tube required downstream of the numerous holes, in the direction of flow, for the purpose of equalizing the temperature differences in the mixed medium to an extent permissible for the outer housing is about seven times the inner diameter thereof. This required tube length, however, results in considerably large dimensions of the mixing device according to the embodiment described in the hereinaforementioned U.S. patent. In addition, the disposition of the holes directly opposite the T-shaped inlet has the disadvantage of effecting non-uniform pressure and temperature distribution in the cross section of the inner tube.

It is an object of the invention of the instant application to provide a compact mixing device for fluids of high different and/or varying temperatures having a cylindrical, straight mixing tube open at both ends thereof and formed intermediate the ends thereof with numerous radial openings, which avoids major temperature oscillations and temperature striping at the wall of the housing and in the adjoining pipelines, to avoid fatigue problems over long periods of operation.

It is another object of the invention, to provide the mixing device with a minimal length and diameter so that it can fit into a piping system with a minimum of occupying space.

It is a further object of the invention to provide such a mixing device which, in special cases, is operable with different flow directions at two of the three connections or unions thereof.

With the foregoing and other objects in view, there is provided, in accordance with the invention, a mixing device for fluids of high, different and varying temperatures having a housing and a cylindrical straight mixing tube open at both ends thereof and formed intermediate the ends thereof with numerous radial openings, the mixing tube being secured at one end thereof tightly to the housing and being mounted at the other end thereof so as to be displaceable longitudinally with respect to the housing, comprising a coaxial shock tube disposed between the mixing tube and the housing and being, at least at one end thereof, displaceable longitudinally with respect to the housing and the mixing tube, the mixing tube having an outflow end and being secured at least at the outflow end thereof tightly to the housing, the shock tube and the mixing tube defining an annular space therebetween, an inner pipe stub terminating in the annular space, the inner pipe stub being concentrically surrounded by a housing union tightly connected to the housing, the shock tube being formed with a radial opening through which the inner pipe stub extends with a gap therebetween.

In accordance with another feature of the invention, the numerous radial openings formed in the mixing tube are located upstream in flow direction between the inlet of the mixing tube and the branch connection.

In accordance with a further feature of the invention, the mixing tube also has an inflow end, the outflow and the inflow ends being of reduced diameter and being connectible with pipelines of correspondingly reduced diameter.

In accordance with an added feature of the invention, the shock tube is spaced from the housing, and a truncated conical member located at a distance from the ends of the shock tube forms a sole resilient connection between the shock tube and the housing.

In accordance with a concomitant feature of the invention, the inner pipe stub is spaced from the housing, and a truncated conical member loated at a distance from the termination of the inner pipe stub in the annular space defined between the mixing tube and the shock tube forms a sole resilient connection between the inner pipe stub and the housing. With this construction of the mixing device according to the invention, direct contact of the entering media with an endangered housing part of different temperature is avoided by disposing a concentric tube both between the mixing tube and the housing as well as within the housing union also.

By disposing the tubes so that they are displaceable in longitudinal direction, stresses due to impeded thermal expansion between the mixing tube, the inner pipe stub and the housing are avoided. Since these tubes are not subjected to any appreciable pressure difference, they need not be made absolutely tight and can have an annular gap at one end thereof. The fluid flowing through the gap between mixing tube and housing reduces the temperature gradient in the wall of the mixing tube. It should be noted, however, that no gap of the mixing tube is provided on the outflow side because, otherwise, temperature stratification or strings can endanger adjacent structural parts. If the direction of flow in the mixing tube can vary, both ends of the mixing tube must be connected tightly to the housing and a gap for separating the mixing tube must be provided therebetween, which should be adequately distant from the ends of the mixing tube. The gaps can also be replaced by a tight elastic corrugated tube which, however, requires a greater diameter.

In order to obtain good mixing, the flows in the inner tube must be turbulent and one or both incoming flows must be split into partial flows by means of numerous openings. Good mixing over a short distance is normally accompanied by a substantial pressure loss. If the inflow through the annular space between the shock tube and the mixing tube is effected into the mixing tube, the inlet velocity through the openings should then be so high that the partial jet will penetrate, in fact, up to the axis of the mixing tube. In tests with water, it has been found, for example, for nominal inner diameters of the mixing tube of about 100 mm and radial holes perpendicular to the axis of the inner tube, the inflow velocity into the holes $v_B$ should be at least equal to and, indeed, even higher than the inflow or supply velocity $v_A$ in the mixing tube, but not more than twice that value, in order to attain favorable mixing conditions in a narrow or small space. $v_A$ was varied from 0.5 to 3.5 m/s. With $v_B/v_A = 1$ to 2, the mean values of the amplitudes of the temperature oscillations decay satisfactorily after a distance of 7-times the inner diameter. With $v_B/v_A = 2$, somewhat larger amplitudes are produced in the vicinity of the holes than with $v_B/v_A = 1$. If $v_B/v_A$ becomes too small, mixing becomes very poor, inasmuch as a ring of liquid is formed at the wall of the inner tube and mixes with the core, which is at a different temperature, only after a considerably great distance has been traversed. In the case of flow instabilities at low velocities, such intermittent temperature strata, stripes or strings stress the wall of the structural part generally more than brief turbulence eddies. If, on the other hand, $v_B/v_A$ becomes too large, the probability of large temperature oscillations in the immediate region of influence of the holes arises. When the throughput is variable, it is advantageous to dispose the holes diametrically opposing and staggered in longitudinal direction, and to exceed the velocity ratio rather than fall short of it. The length of the mixing tube downstream in flow direction, as measured from the end of the openings or holes, should be at least 7-times the diameter. When the direction of inflow and outflow varies, the numerous holes in the mixing tube should begin at least one diameter of the housing away from the region of the union, in order largely to avoid asymmetric inflow over the periphery into the mixing tube from the union or, in the other direction, temperature stripes, strata or strings in the union.

In principle, it is advantageous to dispose the axis of the mixing tube vertically when such mixing tube has a very large diameter, so as to preclude temperature stratification due to differences in buoyancy and in order to better control possible degassing problems.

The disposition of the numerous openings in the mixing tube upstream from the mouth of the inner pipe stub, in accordance with the invention, is always in order if the same inflow direction always prevails at the respective end of the mixing tube, whereas both inflow as well as outflow may prevail at the other two connections or unions of the mixing device.

In these cases, the numerous openings of the mixing tube should be located as close to the inlet as possible. Thereby, in the case of inflow through the inner pipe stub, asymmetric inflow into the mixing tube and, in the case of outflow in the pipe stub, a separation of the fluids in the stub are largely avoided. In addition, the required length of the mixing tube and of the pipe stub, respectively, wherein the outflow occurs, is shortened considerably, since the length corresponding to 7-times the tube diameter does not begin below or downstream of the termination thereof, as described in the hereinaforementioned U.S. patent, but rather, far above or upstream thereof.

The widening of the mixing tube relative to the inflow and outflow pipelines causes a reduction in the velocity level with the same $v_B/v_A$ i.e. the mixture remains in the mixing tube longer, and the temperature oscillations at the outlet or outflow are smaller.

The elastic or resilient connection of the shock tube with the mixing tube and with the housing or of the inner pipe stub with the housing, by means of a truncated conical member serves to reduce the stresses at the joints with the adjoining pipelines. It is always applied, where very rapid temperature changes enter the pipes very frequently and at a high temperature level. These joints are stressed, on the one hand, by forces and moments originating from the pipeline and, on the other hand, these reinforced walls cause additionally high thermal stresses when temperatures heavily transient.

Through the elastic or resilient connection of the pipes to the housing, to the mixing tube, respectively, by means of truncated conical members (so-called Z-fittings) and, in fact, with a spacing from the mouth or termination thereof, maximum stresses due to the pipeline forces do not then occur at the same location at which the structural discontinuity lies which is endangered by thermal stresses.

Other features which are considered as characteristic for the invention are set in the appended claims.

Althrough the invention is illustrated and described herein as embodied in mixing device for fluids of different and varying temperatures, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which:

FIGS. 1 and 2 are diagrammatic sectional views of different embodiments of the mixing device for fluids of different and varying temperatures constructed in accordance with the invention and FIG. 3 is a slightly enlarged fragmentary view of FIG. 2 showing a modified form of construction of the parts contained within the broken-line circle X.

Referring now to the drawing and first, particularly, to FIG. 1 thereof, there is shown an embodiment of the invention having a T-shaped mixing device for two sodium flows to be mixed in a nuclear energy installation. This mixing device is provided for a maximal temperature of about 550° C. at various constant and inconstant temperature differences of the inflows of 50 to 100 K and, for brief periods, of 250 K (below the maximal temperature). The planned operating pressures are considerably lower than in steam plants of similar temperature, and are, in fact, about 16 bar. The planned operating life is 25 years. Three housing stubs or unions 1, 2 and 3 are welded to a T-shaped housing 4, the housing union 1 being suitable only for inflow supply, and the housing unions 2 and 3 being suitable, as desired, for inflow supply or outflow (discharge). A mixing tube 5, which is guided in the vicinity of the housing union 1 so as to be displaceable in longitudinal direction and is fastened tightly at the housing union 3, extends from the housing union 1 to the housing union 3. This mixing tube 5 is surrounded by a concentric or coaxial shock tube 6 which, in the vicinity of the housing union 1, is secured thereto and, in the vicinity of the housing union 3, is guided so as to be displaceable in longitudinal direction. In the vicinity of the housing union 1, the mixing tube 5 is formed with numerous holes 7 which are uniformly distributed over the peripheral surface thereof and through which either the medium entering at the housing union 2 flows inwardly from the outside or the medium entering at the housing unions 1 and 3 flows outwardly from the inside. The housing union 2 is protected from transient temperature stresses by an inner pipe stub 9 disposed concentrically or coaxially thereto.

The pipe stub 9 is elastically or resiliently connected to the housing union 2 by a truncated cone 8 and terminates in the shock tube 6, with a small thermal expansion gap provided between the wall of the pipe stub 9 and the wall of the shock tube 6. The mixing device according to the invention illustrated in FIG. 1 is provided for continuous inflow of a hot medium through the housing union 1. If another medium of different temperature is supplied or flows in through the housing union 2, it is conducted, dampingly stressing the housing union 2, through the pipe stub 9 into the concentric annular space between the shock tube 6 and the mixing tube 5 and flows through the numerous holes 7 into the mixing tube 5, wherein it mixes with the medium entering through the housing union 1 up to the very outlet of the housing union 3, whereby the temperature of both media is equalized to such an extent that the housing union 3 and non-illustrated connecting pipelines are no longer endangered thereat. If the medium entering through the housing union 1 is to be mixed with a medium of different temperature entering through the housing union 3, then these two flows collide in counterflow in the vicinity of the holes or openings 7, which ensures good mixing although also great pressure loss. The media mixture flows outwardly through the openings 7 and is conducted from the annular space between the mixing tube 5 and the shock tube 6 to the pipe stub 9 and to the housing union 2. Further mixing of the media occurs along this path. The length of the path from the end of the openings 7 to the end of the pipe stub 9 should correspond to about 7-times the diameter of the mixing tube 5.

If a medium entering through the housing union 2 is to be mixed with a medium which enters alternatingly either through the housing union 1 or 3, it is advantageous to subdivide the openings 7 formed in the mixing tube 5 into a group above and a group below the pipe stub 9 with a distance of at least two mixing tube diameters from the middle of the pipe stub 9. The annular gap between the mixing pipe 5 and the wall of the shock tube 6 provided for reasons of thermal expansion should not be located directly at the end of the mixing tube 5, when the flow is conducted in this manner, so as to avoid the formation of temperature stripes or strata in the outflow.

The embodiment shown in FIG. 2 is suitable if rapid temperature changes can occur at all three housing unions 1, 2 and 3. All three unions 1, 2 and 3 are thus protected by the connection which is shown in FIG. 1 only at the housing union 2. FIG. 3 shows, on a slightly enlarged scale, the section X (expansion bearing) from FIG. 2 with an alternative construction of the sliding parts 30, 31 of an inner housing stub and the mixing tube 5 or of a housing stub and the shock tube 6. The part 30 is of cylindrical form and the part 31 is spherical or crowned. If both parts 30 and 31 slide on one another due to temperature variations, contact between both thereof is limited to a circular line contact.

In constructions formed of austenitic steel, welding effects must be reckoned with at operating temperatures above about 400° C. In the temperature range between about 380° and 550° C. under sodium conditions, it is advisable to reduce possible releasing or loosening forces by making one of the bearing surfaces crowned or spherical so that the contact surface is kept as small as possible and, simultaneously providing a possiblity for equalizing assembly inaccuracies. At even higher temperatures and contact pressures greater than about 10 N/mm², it is recommended to make the bearing surfaces straight i.e. planar, or crowned i.e. spherical surfaces, one of the bearing surfaces being formed of a harder material than the other; this can be accomplished, for example, by cladding or hardfacing, the different coefficient of thermal expansion of the cladding and the base materials, however, resulting in the formation of constraints.

There are claimed:

1. Mixing device for fluids of high, different and/or varying temperatures comprising a housing and a cylindrical, straight mixing tube open at both ends thereof and formed intermediate the ends thereof with numerous radial openings, the mixing tube being secured at one end thereof tightly to the housing and being mounted at the other end thereof so as to be displaceable longitudinally with respect to the housing, a shock tube disposed between the mixing tube and the housing and being, at least at one end thereof, displaceable longitudinally with respect to the housing and the mixing tube, the mixing tube having an outflow end and being secured at least at said outflow end thereof tightly to the housing, said shock tube and the mixing tube defining an annular space therebetween, an inner pipe stub terminating in said annular space, said inner pipe stub being concentrically surrounded by a housing union tightly connected to the housing, said shock tube being formed with a radial opening through which said inner pipe stub extends with a gap between said radial opening in said shock tube and said inner pipe stub.

2. Mixing device according to claim 1 wherein the mixing tube has an inlet and the numerous radial openings formed in the mixing tube are located upstream in flow direction between said inlet of the mixing tube and the termination of said inner pipe stub in said annular space defined between the mixing tube and said shock tube.

3. Mixing device according to claim 1 wherein the mixing tube also has an inflow end, said outflow and said inflow ends being of reduced diameter, with respect to other portions of the mixing tube between said ends, and being connectible with pipelines of correspondingly reduced diameter.

4. Mixing device according to claim 1 wherein said shock tube is spaced from the housing, and a truncated conical member located at a distance from the ends of said shock tube forms a sole resilient connection between said shock tube and the housing.

5. Mixing device according to claim 1 wherein said inner pipe stub is spaced from the housing, and a truncated conical member located at a distance from the termination of said inner pipe stub in said annular space defined between the mixing tube and said shock tube forms a sole resilient connection between said inner pipe stub and the housing.

6. Mixing device according to claim 1 wherein said mixing tube is spaced from said shock tube, and a truncated conical member located at a distance from the ends of said mixing tube forms a sole resilient connection between said mixing tube and said shock tube.

* * * * *